US008229969B1

(12) United States Patent
Floyd

(10) Patent No.: US 8,229,969 B1
(45) Date of Patent: Jul. 24, 2012

(54) MAINTAINING WEB SESSION DATA SPANNING MULTIPLE APPLICATION SERVERS IN A SESSION DATABASE

(75) Inventor: Gregory R. Floyd, McDonough, GA (US)

(73) Assignee: Open Invention Network LLC, Durham, NC (US)

( * ) Notice: Subject to any disclaimer, the term of this patent is extended or adjusted under 35 U.S.C. 154(b) by 424 days.

(21) Appl. No.: 12/042,090

(22) Filed: Mar. 4, 2008

(51) Int. Cl.
*G06F 7/00* (2006.01)
*G06F 17/30* (2006.01)
(52) U.S. Cl. .................................. 707/802; 707/803
(58) Field of Classification Search ..................... None
See application file for complete search history.

(56) References Cited

U.S. PATENT DOCUMENTS

| | | | | |
|---|---|---|---|---|
| 6,076,108 | A * | 6/2000 | Courts et al. ................ | 709/227 |
| 6,088,728 | A | 7/2000 | Bellemore et al. | |
| 6,098,093 | A | 8/2000 | Bayeh et al. | |
| 6,606,708 | B1 * | 8/2003 | Shifrin et al. ................ | 726/8 |
| 6,820,085 | B2 | 11/2004 | Nishizawa et al. | |
| 7,047,405 | B2 * | 5/2006 | Mauro ........................ | 713/166 |
| 7,117,208 | B2 | 10/2006 | Tamayo et al. | |
| 7,188,181 | B1 | 3/2007 | Squier et al. | |
| 7,216,236 | B2 * | 5/2007 | Kou et al. ................... | 713/183 |
| 7,293,098 | B2 * | 11/2007 | Sandhu et al. ............... | 709/229 |
| 7,979,909 | B2 * | 7/2011 | Jancula et al. ............... | 726/26 |
| 2002/0019827 | A1 * | 2/2002 | Shiman et al. ............... | 707/200 |
| 2002/0065912 | A1 | 5/2002 | Catchpole et al. | |
| 2002/0143958 | A1 | 10/2002 | Montero et al. | |
| 2002/0147920 | A1 * | 10/2002 | Mauro ........................ | 713/200 |
| 2002/0161839 | A1 | 10/2002 | Colasurdo et al. | |
| 2002/0184507 | A1 * | 12/2002 | Makower et al. ............. | 713/182 |
| 2002/0198883 | A1 | 12/2002 | Nishizawa et al. | |
| 2003/0154289 | A1 * | 8/2003 | Williamson et al. .......... | 709/227 |
| 2003/0187677 | A1 | 10/2003 | Malireddy et al. | |
| 2003/0217159 | A1 * | 11/2003 | Schramm-Apple et al. .. | 709/228 |
| 2004/0073512 | A1 * | 4/2004 | Maung ........................ | 705/51 |
| 2004/0143669 | A1 | 7/2004 | Zhao et al. | |
| 2004/0243349 | A1 * | 12/2004 | Greifeneder et al. ......... | 702/183 |
| 2005/0132222 | A1 | 6/2005 | Petrovic | |

(Continued)

FOREIGN PATENT DOCUMENTS

WO WO 2004/088543 10/2004

OTHER PUBLICATIONS

Bipin Joshi, "Storing Session State in a SQL Server Database", http://www.developer.com/db/article.php/3595766.

(Continued)

*Primary Examiner* — Kuen Lu
*Assistant Examiner* — Tuan A Pham
(74) *Attorney, Agent, or Firm* — Haynes and Boone, LLP

(57) ABSTRACT

A method, system, and computer program product for maintaining a web session data spanning multiple servers. A web session is initiated for a web-based application via a client browser. A unique session key is generated for the web session and the web-based application. The session key is stored in the client browser. A web session page-level object is initialized. Session data is then loaded into a memory-mapped cache. Requests for session data from the client browser are received and responded to via a plurality of servers. The modified session data generated during the session is stored into a session database. The web session object is then flushed at the end of the session.

18 Claims, 5 Drawing Sheets

U.S. PATENT DOCUMENTS

| | | |
|---|---|---|
| 2005/0138122 A1 | 6/2005 | Boehringer et al. |
| 2005/0210296 A1* | 9/2005 | Devine et al. .................. 713/201 |
| 2006/0005026 A1* | 1/2006 | Song et al. ..................... 713/173 |
| 2006/0075112 A1 | 4/2006 | Polozoff |
| 2006/0143217 A1 | 6/2006 | Stanev et al. |
| 2006/0168328 A1* | 7/2006 | Shimada et al. .............. 709/238 |
| 2006/0173851 A1 | 8/2006 | Singh et al. |
| 2006/0218625 A1 | 9/2006 | Pearson et al. |
| 2006/0248200 A1 | 11/2006 | Stanev |
| 2006/0294203 A1 | 12/2006 | Nolan |
| 2007/0027896 A1* | 2/2007 | Newport et al. .............. 707/102 |
| 2007/0073829 A1 | 3/2007 | Volodarsky et al. |
| 2007/0094373 A1 | 4/2007 | Brendel |
| 2009/0144546 A1* | 6/2009 | Jancula et al. ................. 713/168 |

OTHER PUBLICATIONS

John Paul Cook, "ASP.NET Session State Management Using SQL Server"; http://www.dbazine.com/sql/sql-articles/cook9.

Yang, et al., "A Practical Password-Based Two-Server Authentication and Key Exchange System", IEEE vol. 3 No. 2, (2006): 105-113.

Chen, et al., "Web-Based Simulations of Power Systems", IEEE (2002): 35-40.

Zhu, et al., "Adaptive Load Sharing for Clustered Digital Library Servers", Technical Report, CS, UCSP, (1998).

* cited by examiner

| Attribute Name | Type | Declaration | Implementation | Default Value |
|---|---|---|---|---|
| Item | Variant | Item(key as Variant, [Optional] confidential as Bool) | Gets/Puts value for specified key.<br><br>If optionally flagged as *confidential*, the value will be encrypted on a put and decrypted on a get. Otherwise, it is treated as plain text. | VT_NULL or Value |
| SessionType | enumSessionType | | | |
| SessionVariable | String | SessionVariable as String | Gets/Puts session variable for the current session type | (1) StDesktopCookie is *ScSessionId*<br><br>(2) StBrowserCookie is *ScBrowserSessionId*<br><br>(3) StQueryString is *ScSessionId*<br><br>(4) StFormVariable is *fScSessionId* |
| SessionId | String | SessionId as String | Retrieves or Sets the current Identity of the Web Session.<br><br>This value is limited to 32 characters | Computed |
| Application | String | Application as String | If set, it will override what is retrieved from the current HOST_NAME or Virtual Directory Root in the IIS Server Variables.<br><br>Get will simply return the current Application.<br><br>This value is limited to 50 characters | Retrieved from Server Variables |

FIG. 2

| Input: | Parameter Name | Type | Required |
|---|---|---|---|
| | SessionId | String | Optional |
| State Changes: | Sets or Assigns the Session Id | | |
| Internal Processing: | If No Session Id is supplied,<br>    If there is not one currently defined for the SessionType<br>        generate a Unique GUID and store it for 24 hrs lifetime<br>    Else<br>        Get the Current Session for the SessionType<br>        If the SessionType is stDesktopCooke or stBrowserCookie Then<br>            Reset its lifetime to 24 hrs<br>        End<br>    End<br>Else use the one supplied.<br>Return the Session Id… | | |
| Validation: | Raise an error condition if:<br>Erorr occurred in internal processing | | |
| Returns: | SessionId As Long (If Successful) | | |

FIG. 3

| Input: | Parameter Name | Type | Required |
|---|---|---|---|
| | Sessiontype | sessionType as EnumSessionType | Optional |
| | SessionVariable | SessionVariable as String | Optional |
| State Changes: | Creates Cache | | |
| Internal Processing: | Attempt Connection<br>If not successful then return E_FAIL<br><br>Retrieve Session Id from SessionType using SessionVariable<br><br>Retrieve all values using stored procedure invocation<br>Update the session $access variable to Now<br>Close Connection<br><br>Set internal map elements<br>Initialize modified map elements to none | | |
| Validation: | Raise an error condition if:<br>Erorr occurred in internal processing | | |
| Returns: | S_OK or E_FAIL | | |

FIG. 4

| Input: | Parameter Name | Type | Required |
|---|---|---|---|
| | <none> | | |
| State Changes: | Removes Cache and writes modified values to the data store. | | |
| Internal Processing: | Attempt Connection<br>If not successful then return E_FAIL<br><br>Store each modified value using stored procedure invocation<br>Close Connection<br><br>Remove internal map elements<br>Remove modified map elements | | |
| Validation: | Raise an error condition if:<br>Erorr occurred in internal processing | | |
| Returns: | S_OK or E_FAIL | | |

FIG. 5

MAINTAINING WEB SESSION DATA SPANNING MULTIPLE APPLICATION SERVERS IN A SESSION DATABASE

BACKGROUND OF THE INVENTION

Embodiments of the invention relate generally to computer servers and databases and, more particularly to maintaining web session data that spans multiple servers in a session database.

Because web farms have no "affinity" and each page request can be routed to a different web server, the user cannot keep state on a web server using session variables. Sessions do not span web servers. To do so would require "sticky IP" sessions, or affinity to a particular web server for the user's session. With sticky IP sessions, a user's Internet Protocol (IP) address is mapped internally to an application server instance when the initial request is served by the application server. All subsequent requests coming from the same IP address are redirected by the web server to the application server based upon the mapping stored. If users belonging to the same organization are behind a firewall, to the external world they will appear to have the same IP address. This will result in all users of such an organization being directed to the same application server for all requests made, rather than only one single user being redirected to the same application server. This will slow down response times and reduce the ability of the web farm to provide a load balanced and fault tolerant system. Session variables also incur about 10 KB of memory overhead in addition to the data that is stored in the session.

Methods of storing session state include, but are not limited to, cookies (size limited to 4K), query strings (size limited to 2K) and hidden-form variables (cause HTML bloat). Each of these methods and other alternatives will work with limited data but require the data to travel first to the client and then back to the server.

SUMMARY OF THE INVENTION

Embodiments of the invention are directed to methods and a system that allow web sites to store user information securely and retrieve it from various pages within a web site and a web farm. Since the information is stored in a separate server database, a cluster of web servers (i.e., web farm) can be supported without any affinity to a particular server. This provides improved performance for enterprise web servers and stability for users and their information as they can add additional servers to meet demand. The information stored can include text, pictures or documents. The information is considered temporary and is purged on a scheduled basis. The information can also be encrypted so that it can be transmitted and stored in a secure medium.

In one embodiment, a method, system, and computer program product are provided for maintaining a web session data spanning multiple servers. In the method, a web session is initiated for a web-based application via a client browser. A unique session key is generated for the web session and the web-based application. The session key is stored in the client browser. A web session page-level object is initialized. Session data is then loaded into a memory-mapped cache. Requests for session data from the client browser are received and responded to via a plurality of servers. The modified session data generated during the session is stored into a session database. The web session object is then flushed at the end of the session.

The system includes a plurality of components that perform the steps of the method when operated on a computer system. The computer program product includes a computer readable medium having computer instructions embedded therein, the computer readable medium implementing the method when operated on the computer system.

BRIEF DESCRIPTION OF THE DRAWINGS

These and other advantages and aspects of the embodiments of the invention will become apparent and more readily appreciated from the following detailed description of the embodiments taken in conjunction with the accompanying drawings, as follows.

FIG. 2 illustrates the attributes (properties) of the Web Session object in accordance with an exemplary embodiment of the invention.

FIG. 3 illustrates the internal processing for the Initialize method in accordance with an exemplary embodiment of the invention.

FIG. 4 illustrates the internal processing for the Load method in accordance with an exemplary embodiment of the invention.

FIG. 5 illustrates the internal processing for the Flush method in accordance with an exemplary embodiment of the invention.

DETAILED DESCRIPTION

The following description is provided as an enabling teaching of embodiments of the invention including the best, currently known embodiment. Those skilled in the relevant art will recognize that many changes can be made to the embodiments described, while still obtaining the beneficial results of the disclosed embodiments. It will also be apparent that some of the desired benefits of the embodiments described can be obtained by selecting some of the features of the disclosed embodiments without utilizing other features. Accordingly, those who work in the art will recognize that many modifications and adaptations to the embodiments described are possible and may even be desirable in certain circumstances. Thus, the following description is provided as illustrative of the principles of the invention and not in limitation thereof, since the scope of the invention is defined by the claims.

The following terms are used throughout this description, and have the meanings indicated.

Web Session—a distinct unit of work tied to an application and a user. A unique web session is tied to the browser instance, but can also span multiple browser instances if configured to do so.

SessionID—a unique identifier representing a web session with an encrypted string.

Application—the base virtual directory or site name for a web application.

Page—An ASP page that renders HyperText Markup Language (HTML) to the client browser. Its existence is measured by the time it takes for the web server to interpret and respond with HTML, typically short-lived on an efficient server (time measured in milliseconds).

Embodiments of the invention works for multiple platforms (e.g., Java, PHP, ASP, ASP.Net), operating systems (e.g., Windows, UNIX) and web application servers. This allows a large enterprise to share information across disparate systems without writing custom code and procuring a database for each system. It also keeps the user from having to pass information indiscreetly through a web request to another web application. Many large enterprises store highly available data on database servers, such as Oracle and SQL. In addition, there could be multiple web servers that support a single application. Some applications share data for a single user but exist on different servers. To solve this problem, embodiments of the invention include several components that store web session data and that can retrieve the information. A centralized data repository, such as the relational databases that are provided by Oracle Corporation, can be used to store web session data. These components could include the following:

|  | Language | Operating System | Platform |
| --- | --- | --- | --- |
| EnterpriseWebSession.dll | C++ | Windows | ASP/COM |
| EnterpriseWebSessionNet.dll | C# | Windows | ASP.Net |
| JSession | Java | <any> | J2EE |
| EnterpriseWebSessionProvider.dll | C# | Windows | ASP.Net Provider |

Figure 1:
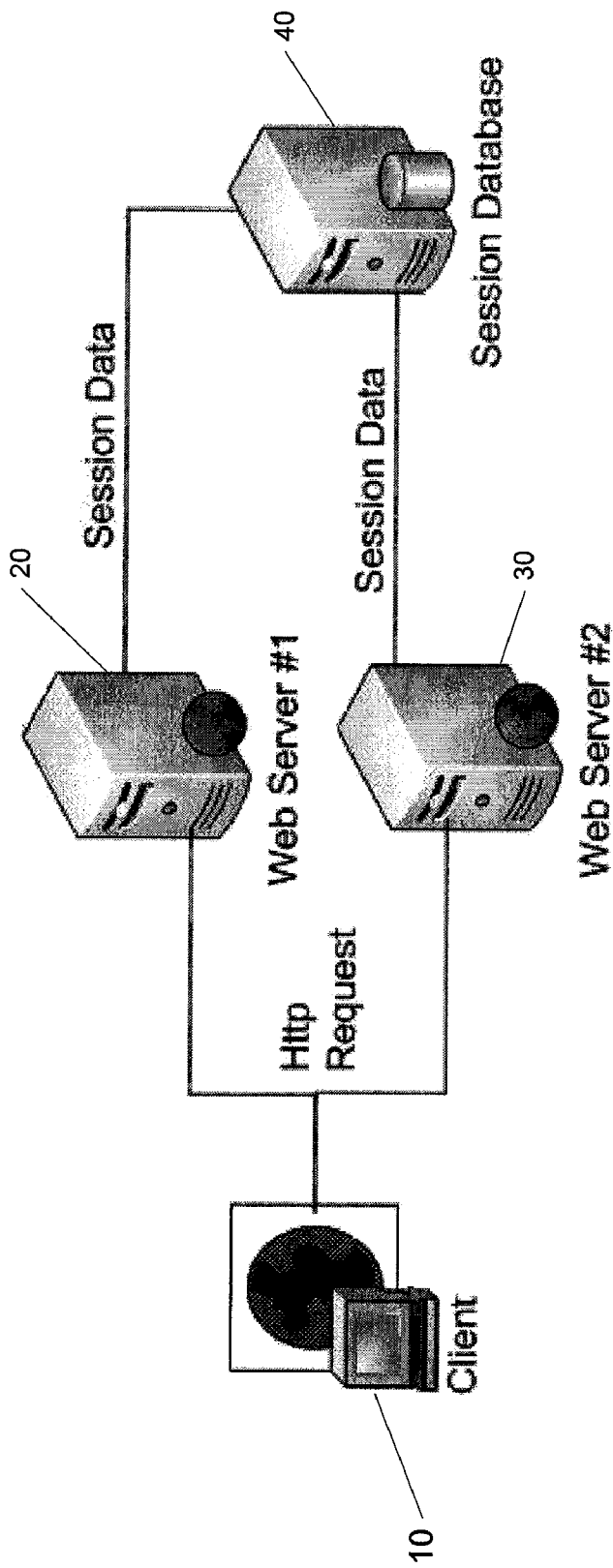
FIG. 1 illustrates a multiple server environment in which web session data spans multiple application servers in accordance with an exemplary embodiment of the invention.

Each component reads and writes data into a database record for user session data. Embodiments of the invention segregate data by application name and session key. With reference to FIG. 1, when the user initializes a session via client 10, a unique session key is generated which is stored in a session cookie in the client's browser. This session data can be shared by multiple applications that share the same domain. The user can also override the session key by specifying a specific session key and share data across domains. When the user writes session data into the session database 40, he has the option of encrypting secure information. Since these components exist on the web servers 20, 30, the user can transmit secure information from the web servers 20, 30 to the session database 40 and back.

Embodiments of the invention are very generic in application. Embodiments of the invention could work for any enterprise information technology (IT) shop that needs session information to span multiple web servers in a farm and must work with relational database systems. Embodiments of the invention facilitate integration of application sites without requiring a specific database. Furthermore, if the enterprise IT shop requires non-Microsoft and Microsoft IIS integration, embodiments of the invention described herein would suffice.

The Web Session object provides web applications with the ability to keep user session state in a web farm. It does so by replacing the common Active Server Pages (ASP) and ASP-.Net session object with a page-level object that persists data to a central data store accessible to the web farm servers.

The effect of this effort is to increase web server response rates, reduce memory overhead, remove bloated HTML and improve the overall efficiency and operation of the web farm.

The Web Session object will allow the user to put and get user information between page invocations for the currently running application. It retrieves session data on the first invocation and caches it in the page. If any variables are stored, it will push that data to the central data store to be retrieved on a subsequent page. It keeps session data on the server without redundant trips to the client's browser.

This page-level object lives only for the duration of the ASP page. When it is created (i.e., initialized), it retrieves any variables that have been stored for the current application and user. When it is destroyed (i.e., flushed), it stores variables and their data to the central data repository. If no items are assigned (or modified) on a single page, there will be no need to store the data. Instead, the object will only read the session data for the current page.

Each session can be tied uniquely to the browser or allow multiple instances of the browser within the same application to share their data. For example, if one browser views a bill and second instance is launched to view a printed format then the information could be shared for that application. On the other hand, if the user has a listing of accounts, and each new instance of the browser displays different account details, then the user would not want to share user data, but instead, create a unique subset of shared data tied to the browser instance. Therefore, each successive page of account details in the new instances of the browser could open a distinct session to share.

Unique browser sessions can be achieved in all browsers by using the default implementation of the Web Session object. FIG. 2 illustrates the attributes (properties) of the Web Session object. To share data across browser instances or mix content, the user can use the SessionType and SessionVariable properties.

In an exemplary embodiment, the Web Session object can be written as an agile component using Microsoft C++ and Active Template Library (ATL) 3.0. The Web Session object could be written to take advantage of a web application running under the Microsoft Transaction Server (MTS). Although the Web Session object is not an MTS object, it is both-threaded, aggregates the Free Threaded Marshaler (FTM) and supports the IObjectContext interface. FTM can be used when the object does not store state across methods. It can also be used in out-of-process server components. When aggregating the FTM, FTM-based objects must ensure that they can be called from any thread in the process. Since FTM-based objects are context neutral, they have no context of their own, and must use the caller's context. The IObjectContext interface provides access to the current object's context. An object's context is used when working with transactions or dealing with object security. This allows each instance to join the "apartment" of the calling thread and removes "cross-apartment" communications and marshalling. By doing this, there is no degradation when communicating with the ASP session and application objects. It also supports synchronized access to shared attributes of the object.

The Web Session object uses Microsoft's *Object Linking and Embedding, Database* (OLE DB) application programming interface (API) to access a database, such as that provided by Oracle Corporation. It uses these methods to store session variables from which any web server can pull. For database operation, the Web Session object invokes stored procedures and prepared commands to provide optimal database access and control. The Web Session object is also fully scalable (e.g., up to five database servers in an exemplary embodiment) by allowing multiple data stores to be configured and assigned to a session through a hash algorithm. There is no redundancy built into the object, thus, the data is not stored redundantly into each database. In one embodiment, once a connection is established, the Web Session object assumes the database is configured properly with Oracle clustered servers and/or parallel processing.

The Web Session object provides secure data with the ability to encrypt it before storing the value. When storing variables, the user can optionally store them as confidential. This will encrypt the data for that item and store the data encrypted using the Microsoft Cryptographic Application Programming Interface (Crypto API) as the default.

The Web Session object is to be used at the page level and should be created and destroyed within the ASP page. It should not be used at the session or application level. To achieve the full benefit of non-stateful web applications, the user should turn off "Sessions" in the control panel for the supported application and use this object for state data. The impact of this object on a rendering web page should be minimal. In fact, the Web Session object can read and write 1000 variables in less than one second.

Using the default implementation, a session ID is generated for a browser session and a HOST_Named application. If the browser accepts cookies, this is the easiest implementation and each instance of the browser will have a unique session assigned.

In one exemplary embodiment, this object could be installed on a Windows NT Client/Server or Windows 2000 platform with Microsoft Internet Information Service (IIS) installed. This object could be registered locally with execute privileges and run under an NT User ID that has access to the registry.

Furthermore, in exemplary embodiments, any web application that uses the Web Session object could be run under the Microsoft Transaction Server (MTS). Optimally, the web application could be run out-of-process with the object loaded into the MTS process. The Web Session object will only work when miming under the same process as the web application as it uses the "Object Context" to communicate with IIS and its components. The Object Context object is used to control Active Server Pages that are managed by MTS.

In one exemplary embodiment, the Web Session object would require few complimentary components to run. The Web Session object uses a database and finds the data source by referencing the connect string in the registry. The Web Session object also must have a default provider for Microsoft Crypto API. The Web Session object relies on Microsoft Data Access Components (MDAC) 2.1 and OLE DB. The user must also have configured the database (e.g., Oracle) client. Microsoft Data Access Components (MDAC) is a collection of components used to provide database connectivity on Windows platforms. MDAC is included by default as part of Windows XP, Windows 2000, Windows 2003, and Vista operating systems.

In one exemplary embodiment, the Web Session object uses the following registry settings:

| Registry Key | Data Type | Value | Description |
| --- | --- | --- | --- |
| HKLM\Software\Enterprise\WebSession\oraXXX | String | <connectString> | Oracle Connection String using the format: Provider=MSDAORA.1; Data Source=xxx;User Id=xxx;Password=xxx; ConnectionTimeout=1 |

To take advantage of quick connections and scalable database, the user can specify a ConnectTimeout value in the connect string and create multiple database connection entries in the registry. There are a number of possible data sources that can be configured. Each data store is assigned through a hash algorithm of the SessionID. If a failure occurs, sequential assignment will begin at the first connection enumerated in the registry. If no ConnectionTimeout or CommandTimeout is specified in the connect string, then a value of five and ten seconds will be assigned respectively (only for non-ODBC providers).

Method Summary for Web Session Object

Initialize Method: The Initialize method creates a session. It is only necessary to invoke this method on the first page of an application. The method initializes a session by using the supplied SessionID (32-bit character) or by generating a unique Session ID. FIG. 3 illustrates the internal processing for the Initialize method. If the SessionType is stDesktopCookie or stBrowserCookie, a cookie is stored (or attempted). Otherwise, successive commands can retrieve the generated Session ID by using the SessionID property. The Initialize method is called automatically on the first Get/Put of a session item variable.

Usage:
  Initialize ([VARIANT vSessionId])
Example
  Initialize

Load Method: The Load method loads session data from the database into a memory-mapped cache. Memory-mapped data stores all of the session keys/values and keeps up with updates so that is can write the updates back to the database. This data is read from the database initially, and holds all values in memory for the lifetime of a single page. This is effectively a short-lived cache. If the values are changed, only the changed or new values are written back to the database. Initially, all data is stored in the database. Subsequent pages only push changes to what is already in the database by looking at flags in the memory-mapped area.

FIG. 4 illustrates the internal processing for the Load method. Until the object goes out of scope, the object is set to nothing, or the Flush method is called, all data is retrieved from this cache. The user can optionally provide a SessionType or SessionId instead of calling method Initialize. This method allows the user to control when the data is loaded.

Usage:
  Load ([VARIANT vSessionType], [VARIANT vSessionId])
Example:
  Load

Flush Method: The Flush method stores session data to the database from the memory-mapped cache. FIG. 5 illustrates the internal processing for the Flush method. Flush is called automatically in the objects destructor. This method gives the programmer the control to set when the data is put back into the database. On invocation, all cache is destroyed and the object is left empty.

Usage:
  Flush ( )
Example:
  Flush

Attribute (Property) Summary for Web Session Object

FIG. 2 illustrates the attributes (properties) of the Web Session object and describes the name, type, declaration, implementation, and default value for each attribute identified. The Web Session object attributes include item, session type, session variable, session ID, and application.

Item Property: This property encapsulates a session variable. Each item is identified by a string "Key" and can optionally be tagged as confidential. Items are encrypted and stored as a hexadecimal string, thus doubling the storage size of the variable.

Usage:
 VARIANT vItem=Item(VARIANT Key, [VARIANT Confidential])
 Item(VARIANT Key, [VARIANT Confidential])=VARIANT vItem Example:
 object.Item("UserName")="Greg"
 object("UserName")="Greg"
 sName=object.Item("UserName") or . . .
 sName=object("UserName")

Session Type Property: This is an enumerated property of type enumSessionType that dictates how the session will be identified to the browser. This can occur through a cookie, query string or form variable.

Usage:
 SessionType=VARIANT vType

Example:
 Object.SessionType=vtBrowserCookie

SessionID Property: This property assigns the SessionID when a generated Globally Unique Identifier (GUID) will not work. If can only be assigned before the Initialize method is called. It can be retrieved at any time. A session ID is a maximum of 32 characters and could uniquely identify a user on a web farm.

Usage:
 SessionId=VARIANT vSessionId
 VARIANT vSessionId=SessionId

Example:
 object.SessionId="Greg"
 vSessionId=object.SessionId

SessionVariable Property: This is a property that names the cookie, query string, or form variable to retrieve when looking for an existing session ID. Once the session is initialized, every instance created will look in a specific place (i.e., the browser cookie, desktop cookie, query string or form variable) for a session variable named using this property. Default values exist for all session types. In one embodiment, the default value for Query String and Form Variable is: ScSessionId.

Usage:
 SessionVariable=VARIANT vVariableName

Example:
 Object.SessionVariable="fSessionId"

Application Property: This is a property that names the application. The application and SessionID uniquely identify a web application and user session. If not set, the application will default to the web application's HOST_NAME that is identified in the HTTP headers.

Usage:
 Application=VARIANT vApplicationName

Example:
 Object.Application="STARS"

In high level computer programming languages, an enumerated type is an abstract data type that is used to model an attribute with a limited number of options. For example, in C# the enum keyword is used to declare an enumeration, a distinct type having a set of named constants. By default, the first enumerator on the list has the value zero. The value of each successive enumerator is increased by one. The following table describes the enumerated session type and set of values used in embodiments of the invention.

Enum Type:

| Name | Value | Description |
| --- | --- | --- |
| EnumSessionType | Long | The Session Type identifies where the session identifier is kept. Values include:<br>stBrowserCookie = 0<br>stDesktopCookie = 1<br>stQueryString = 2<br>StFormVariable = 3<br>StAny = 4 |

Figure 6:
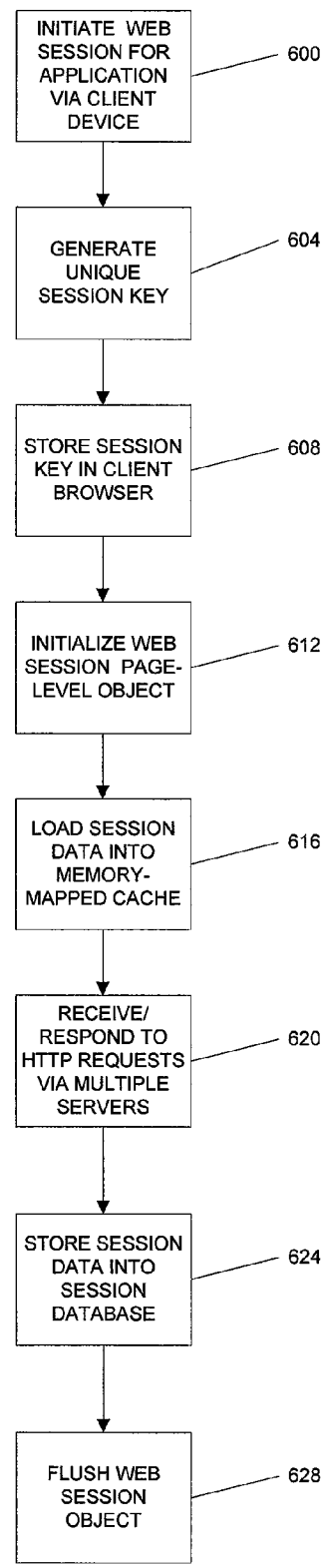
FIG. 6 illustrates processing logic for maintaining web session data spanning multiple servers in accordance with an exemplary embodiment of the invention.

FIG. 6 illustrates processing logic for maintaining web session data spanning multiple servers in an exemplary embodiment. A web session for a web application is initiated by a user via a client device as indicated in logic block 600. A unique session key is then generated that is based on the web session and the web application as indicated in logic block 604. The session key can be stored in a session cookie in the client browser for the duration of the session as indicated in logic block 608. A web session page-level object is initialized as indicated in logic block 612. Session data is then loaded into a memory-mapped cache as indicated in logic block 616. The multiple web servers receive and respond to requests for web pages via HTTP requests from the client browser, as indicated in logic block 620. The session data in the memory-mapped cache is stored in the session database at the end of the session, as indicated in logic block 624. The session data can be encrypted before it is stored in the database. The web session object is then flushed as indicated in logic block 628. Flushing the web object results in session data being deleted from the cache and the web session object being emptied.

The following example simply uses the session object and its default properties to pass information between two ASP pages. The session information will be stored in the database using a computed GUID and the HOST_NAME for the virtual site. The SessionID will remain in a browser cookie until the browser is closed. Each browser will receive a unique SessionID. The user could use different Session Types.

Page1.asp
 Dim o
 Set o=CreateObject("EnterpriseWebSession.UserSession")
 o("OperatorId")="grfloyd"
 Set o=Nothing
Page2.asp
 Dim o
 Set o=CreateObject("EnterpriseWebSession.UserSession")
 Response.write o("OperatorId")
 Set o=Nothing The next example simply uses the session object to pass information between two ASP pages. The session information will be stored in the database using a computed Globally Unique Identifier (GUID) and the HOST_NAME for the virtual site. The SessionID will remain in a browser cookie until the browser is closed. Both this example (Scenario 2) and the next example (Scenario 3) use an example of a customer service operator retrieving multiple accounts for a representative and looking at the details of each individual account and its line items.

logon.asp
 Dim o
 Const stDesktopCookie=1

```
Set   o=CreateObject("EnterpriseWebSession.UserSes-
sion")
   o.SessionType=stDesktopCookie
   o.Initialize
   o("OperatorId")="grfloyd"
   Set o=Nothing
acctlist.asp
   Dim o
   Set   o=CreateObject("EnterpriseWebSession.UserSes-
sion")
   o.SessionType=stDesktopCookie
   sUserId=o("OperatorId")
   o("AcctId")=sSelectedAcct
   Set o=Nothing
accthdr.asp
   Dim o
   Dim p
   Set   o=CreateObject("EnterpriseWebSession.UserSes-
sion")
   o.SessionType=stDesktopCookie
   sAcctId=o("AcctId")
   Set o=Nothing
   Set   p=CreateObject("EnterpriseWebSession.UserSes-
sion")
   p.Initialize( )
   p("AcctName")=sAcctName
   Set p=Nothing
acctitm.asp
   Dim o
   Dim p
   Set   o=CreateObject("EnterpriseWebSession.UserSes-
sion")
   o.SessionType=stDesktopCookie
   sOperId=o("OperatorId")
   Set o=Nothing
   Set   p=CreateObject("EnterpriseWebSession.UserSes-
sion")
   sAcctName=p("AcctName")
   Set p=Nothing
```

When an application cannot dictate that all client browsers will accept cookies, then the user can set the Session Type to use either the query string or a hidden form variable. The following example uses a query string. It creates two instances of the browser, one for multiple account listings and the other for account details with line item charges. Thus, each detailed ASP will require a unique session ID to be passed on the Uniform Resource Locator (URL) and the original session ID for logon information. This example represents a complex scenario that would not normally be required.

```
logon.asp
   Dim o
   Dim
   Set   o=CreateObject("EnterpriseWebSession.UserSes-
sion")
   o.SessionType=stQueryString
   sSessionId=o.Initialize( ) 'Generate unique session Id
   o("OperatorId")="grfloyd" 'and pass it using URL
   Set o=Nothing
acctlist.asp
   Dim o
   Set   o=CreateObject("EnterpriseWebSession.UserSes-
sion")
   'Since we are calling Initialize, we will retrieve
   'the Session Id from the URL using the default
   'Session Variable name.
   o.SessionType=stQueryString
   sUserId=o("OperatorId")
   o("AcctId")=sSelectedAcct
   Set o=Nothing
accthdr.asp
   Dim o
   Dim p
   Set   o=CreateObject("EnterpriseWebSession.UserSes-
sion")
   o.SessionType=stQueryString
   sAcctId=o("AcctId")
   Set o=Nothing
   Set   p=CreateObject("EnterpriseWebSession.UserSes-
sion")
   p.SessionType=stQueryString
   sNewSessionId=p.Initialize( )
   'Generate new session Id
   'and pass it in URL as "NewSessionId="
   p("AcctName")=sAcctName
   Set p=Nothing
acctitm.asp
   Dim o
   Dim p
   Set   o=CreateObject("EnterpriseWebSession.UserSes-
sion")
   o.SessionType=stQueryString
   sOperId=o("OperatorId") 'Use default sessionId variable
   Set o=Nothing
   Set   p=CreateObject("EnterpriseWebSession.UserSes-
sion")
   o.SessionType=stQueryString
   o.SessionVariable="NewSessionId" 'Look for new one
   sAcctName=p("AcctName")
   Set p=Nothing
```

The system and method embodiments of the invention have been described as computer-implemented processes. It is important to note, however, that those skilled in the art will appreciate that the mechanisms of the disclosed embodiments are capable of being distributed as program products in a variety of forms, regardless of the particular type of physical signal bearing media utilized to carry out the distribution. Examples of signal bearing media include, without limitation, recordable-type media such as diskettes or CD ROMs.

The corresponding structures, materials, acts, and equivalents of all means plus function elements in any claims below are intended to include any structure, material, or acts for performing the function in combination with other claim elements as specifically claimed. Those skilled in the art will appreciate that many modifications to the exemplary embodiments are possible without departing from the scope of the present invention.

In addition, it is possible to use some of the features of the embodiments disclosed without the corresponding use of the other features. Accordingly, the foregoing description of the exemplary embodiments is provided for the purpose of illustrating the principles of the invention, and not in limitation thereof, since the scope of the present invention is defined solely by the appended claims.

What is claimed:

1. A method for maintaining web session data spanning multiple servers, comprising the steps of:
   initiating a web session for a web-based application via a client browser;
   generating a unique session key for the web session and web-based application by the client browser;
   storing the session key in the client browser as a unique session identification (ID);

initializing a web session page-level object by the client browser which retrieves at least one of a current web-based application variable and a user specific variable;

loading session data into a memory-mapped cache including the web session page-level object with the at least one current application variable and the user specific variable;

receiving and responding to requests for session data from the client browser via a plurality of servers;

replacing at least one active server page (ASP) and ASP session object associated with the web-based application with the web session page-level object and storing the web session page-level object in a session database;

storing modified session data into the session database;

flushing the web session page-level object at the end of the session by deleting the session data from the memory-mapped cache and emptying data in the web session page-level object; and sharing web session data across a plurality of platforms and operating systems, wherein the plurality of platforms comprises at least two of a Java platform, a PHP (Hypertext Preprocessor) platform, an ASP (Active Server Pages) platform, and an ASP.Net platform.

2. The method for maintaining web session data spanning multiple servers of claim 1 further comprising encrypting the session data before storing the modified session data into the session database.

3. The method for maintaining web session data spanning multiple servers of claim 1 wherein the session key is stored in a session cookie in the client browser.

4. The method for maintaining web session data spanning multiple servers of claim 1 further comprising configuring and assigning multiple databases to the web session through a hashing algorithm.

5. The method for maintaining web session data spanning multiple servers of claim 1 wherein the web session object includes at least one of an item attribute, a session type attribute, a session variable attribute, a session identifier attribute, and an application attribute.

6. The method for maintaining web session data spanning multiple servers of claim 1 wherein the session database comprises a relational database.

7. The method for maintaining web session data spanning multiple servers of claim 1 wherein the plurality of operating systems comprises a Windows operating system and a UNIX operating system.

8. A system for maintaining web session data spanning multiple servers, comprising:

a database for storing the web session data;

a processor for executing a plurality of components, including:

a component for initiating a web session for a web-based application via a client browser;

a component for generating a unique session key for the web session and web-based application;

a component for storing the session key in the client browser as a unique session identification (ID);

a component for initializing a web session page-level object which retrieves at least one of a current web-based application variable and a user specific variable;

a component for loading session data into a memory-mapped cache including the web session page-level object with the at least one current application variable and the user specific variable;

a component for receiving and responding to requests for session data from the client browser via a plurality of servers;

a component for replacing at least one active server page (ASP) and ASP session object associated with the web-based application with the web session page-level object and storing the web session page-level object in a session database;

a component for storing modified session data into the session database;

a component for flushing the web session page-level object at the end of the session by deleting the session data from the memory-mapped cache and emptying data in the web session page-level object:

a component for maintaining web session data spanning multiple servers, wherein web session data is shared across a plurality of platforms and operating systems; and a component for maintaining web session data spanning multiple servers, wherein the plurality of platforms comprises at least two of a Java platform, a PHP (Hypertext Preprocessor) platform, an ASP (Active Server Pages) platform, and an ASP.Net platform.

9. The system for maintaining web session data spanning multiple servers of claim 8 further comprising a component for encrypting the session data before storing the modified session data into the session database.

10. The system for maintaining web session data spanning multiple servers of claim 8 wherein the session key is stored in a session cookie in the client browser.

11. The system for maintaining web session data spanning multiple servers of claim 8 further comprising a component for configuring and assigning multiple databases to the web session.

12. The system for maintaining web session data spanning multiple servers of claim 8 wherein the web session object includes at least one of an item attribute, a session type attribute, a session variable attribute, a session identifier attribute, and an application attribute.

13. The system for maintaining web session data spanning multiple servers of claim 8 wherein the plurality of operating systems comprises a Windows operating system and a UNIX operating system.

14. A non-transitory computer program product for maintaining web session data spanning multiple servers when operated on a processor, the computer program product comprising a computer readable medium having computer readable code embedded therein, the computer readable medium comprising:

program instructions that initiate a web session for a web-based application via a client browser;

program instructions that generate a unique session key for the web session and web-based application;

program instructions that store the session key in the client browser as a unique session identification (ID);

program instructions that initialize a web session page-level object;

program instructions that load session data into a memory-mapped cache including the web session page-level object with the at least one current application variable and the user specific variable;

program instructions that receive and respond to requests for session data from the client browser via a plurality of servers;

program instructions that replace at least one active server page (ASP) and ASP session object associated with the web-based application with the web session page-level object and storing the web session page-level object in a session database;

program instructions that store modified session data into a session database;

program instructions that flush the web session page-level object at the end of a session by deleting the session data from the memory-mapped cache and emptying data in the web session page-level object;

program instructions that maintain web session data spanning multiple servers, wherein the computer readable medium further comprises program instructions that share web session data across a plurality of platforms and operating systems; and program instructions that maintain web session data spanning multiple servers, wherein the plurality of platforms comprises at least two of a Java platform, a PHP (Hypertext Preprocessor) platform, an ASP (Active Server Pages) platform, and an ASP.Net platform.

15. The non-transitory computer program product for maintaining web session data spanning multiple servers of claim 14 wherein the computer readable medium further comprises program instructions that encrypt the session data before storing the modified session data into the session database.

16. The non-transitory computer program product for maintaining web session data spanning multiple servers of claim 14 wherein the computer readable medium further comprises program instructions that store the session key in a session cookie in the client browser.

17. The non-transitory computer program product for maintaining web session data spanning multiple servers of claim 14 wherein the computer readable medium further comprises program instructions that configure and assign multiple databases to the web session.

18. The non-transitory computer program product for maintaining web session data spanning multiple servers of claim 14 wherein the plurality of operating systems comprises a Windows operating system and a UNIX operating system.

* * * * *